United States Patent
Schmidt et al.

(10) Patent No.: US 10,550,924 B2
(45) Date of Patent: Feb. 4, 2020

(54) TRANSMISSION

(71) Applicant: Wittenstein AG, Igersheim (DE)

(72) Inventors: Michael Schmidt, Reichenberg (DE);
Heiko Schreiber, Gnaschwitz (DE);
Frank Michel, Weikersheim (DE);
Thomas Bayer, Igersheim (DE)

(73) Assignee: Wittenstein AG, Igersheim (DE)

( * ) Notice: Subject to any disclaimer, the term of this patent is extended or adjusted under 35 U.S.C. 154(b) by 0 days.

(21) Appl. No.: 13/850,047

(22) Filed: Mar. 25, 2013

(65) Prior Publication Data

US 2013/0255421 A1  Oct. 3, 2013

(30) Foreign Application Priority Data

Mar. 30, 2012 (DE) .................. 10 2012 102 802

(51) Int. Cl.
*F16H 55/08* (2006.01)
*F16H 25/20* (2006.01)
*F16H 25/02* (2006.01)
*F16H 25/06* (2006.01)

(52) U.S. Cl.
CPC ............ *F16H 55/08* (2013.01); *F16H 25/02* (2013.01); *F16H 25/06* (2013.01); *F16H 25/2009* (2013.01)

(58) Field of Classification Search
CPC . F16H 1/06; F16H 25/12; F16H 25/16; F16H 25/186; F16H 25/229; F16H 35/00; F16H 37/12; F16H 49/001; F16H 2049/003; F16H 2049/006; F16H 2049/008; F16H 55/0833; F16H 55/17; F16H 1/321; F16H 2001/325; F16H 2001/327; F16H 25/02; F16H 25/04; F16H 55/10; F16H 25/2009

USPC ...... 74/89, 122, 125, 415, 424.71, 457, 640, 74/216.3, 406, 433, 438
See application file for complete search history.

(56) References Cited

U.S. PATENT DOCUMENTS

| 2,906,143 A * | 9/1959 | Musser ................. F16H 49/001 |
| | | 285/276 |
| 2,930,254 A * | 3/1960 | Musser ................. F16H 49/001 |
| | | 74/640 |
| 2,931,248 A * | 4/1960 | Musser .......................... 74/640 |

(Continued)

FOREIGN PATENT DOCUMENTS

DE  102004037939 A1 * 3/2006
DE  10 2006 042 786 B4  9/2008

(Continued)

OTHER PUBLICATIONS

13850047 Fig. A, Alternative Drawing from Chen et al., U.S. Pat. No. 4,798,104.*

(Continued)

*Primary Examiner* — Bobby Rushing, Jr.
(74) *Attorney, Agent, or Firm* — Moser Taboada

(57) ABSTRACT

A transmission, in particular a coaxial transmission or linear transmission, comprising a toothing, a tooth holder in which a plurality of tooth segments are accommodated to engage with the toothing, wherein the tooth segments are borne to be radially shiftable relative to the tooth holder, a drive element having a profiling for radially driving the tooth segments borne in a radially shiftable manner, wherein the transmission has inner initial stress.

2 Claims, 5 Drawing Sheets

(56) References Cited

U.S. PATENT DOCUMENTS

| | | | | |
|---|---|---|---|---|
| 2,983,162 | A * | 5/1961 | Musser | F16H 49/001 |
| | | | | 74/640 |
| 3,565,006 | A * | 2/1971 | Stewart | 101/248 |
| 3,659,496 | A * | 5/1972 | Bergemann | B23F 5/14 |
| | | | | 409/47 |
| 4,099,427 | A * | 7/1978 | Fickelscher | 475/176 |
| 4,620,457 | A * | 11/1986 | Distin et al. | 475/164 |
| 4,736,654 | A * | 4/1988 | Ren | 475/168 |
| 4,798,104 | A * | 1/1989 | Chen et al. | 74/63 |
| 5,282,398 | A * | 2/1994 | Ishikawa | F16H 55/0833 |
| | | | | 74/640 |
| 5,643,128 | A * | 7/1997 | Kennedy | 475/168 |
| 5,931,054 | A * | 8/1999 | Shirokoshi et al. | 74/640 |
| 5,989,144 | A * | 11/1999 | Chen et al. | 475/168 |
| 6,416,438 | B1 * | 7/2002 | Choi et al. | 475/170 |
| 6,664,711 | B2 * | 12/2003 | Baudendistel | H02N 2/105 |
| | | | | 310/323.02 |
| 7,721,625 | B2 * | 5/2010 | Saito | 74/640 |
| 7,819,041 | B2 * | 10/2010 | Yamamori et al. | 74/640 |
| 8,579,090 | B2 * | 11/2013 | Yamasaki | 188/72.8 |
| 8,704,620 | B2 * | 4/2014 | Rhodes | F16H 25/2003 |
| | | | | 333/232 |
| 2005/0280303 | A1 * | 12/2005 | Klindworth | 297/373 |
| 2006/0283289 | A1 * | 12/2006 | Baudendistel et al. | 74/640 |
| 2007/0261516 | A1 * | 11/2007 | Saito | 74/640 |
| 2010/0024593 | A1 * | 2/2010 | Schmidt et al. | 74/640 |
| 2010/0077882 | A1 | 4/2010 | Schreiber | |

FOREIGN PATENT DOCUMENTS

| | | | |
|---|---|---|---|
| DE | 10 2007 011 175 A1 | 9/2008 | |
| DE | 10 2007 019 607 A1 | 10/2008 | |
| DE | WO 2008119551 A2 * | 10/2008 | F16H 25/06 |
| EP | 1859179 A1 | 4/2010 | |
| JP | 60143245 A * | 7/1985 | F16H 1/32 |
| JP | H0666350 A | 3/1994 | |
| JP | 2007205397 A | 8/2007 | |
| JP | 2010523906 A | 7/2010 | |

OTHER PUBLICATIONS

German Search Report; dated Jan. 8, 2013, for DE102012102802.8, pp. 1-8.

Chinese Office Action dated May 26, 2015 for Chinese Patent Application No. 201310109497.6, 9 pages.

German Office Action dated Mar. 2, 2016 for German Patent Application No. 17208P-DE.

* cited by examiner

TRANSMISSION

RELATED APPLICATIONS

This application claims priority to German Application Serial Number 102012102802.8 filed Mar. 30, 2012, which is herein incorporated by reference.

BACKGROUND

Field of the Invention

The invention relates to a transmission and a method for manufacturing or operating a transmission according to the independent claim.

Prior Art

Transmissions are known from the prior art that comprise tooth segments, which are mounted in a tooth holder in a radially shiftable manner. To drive the tooth segments, drive elements with a profiling are used, such as cam discs. The teeth of the tooth segments engage in a toothing, thus causing a relative movement between the tooth holder with the tooth segments and the toothing. The relative movement between the toothing and the tooth segments is less than the movement of the drive element with the profiling by at least one order of magnitude. High transmission ratios can be achieved in this manner; an example of such a transmission is disclosed in DE 10 2007 011 175 A1.

Although such transmissions possess a very high torsional stiffness, torsional play can arise under changing loads. With highly precise drives, both high torsional stiffness and freedom from play are required, however, in order to ensure precise positioning over a broad range of loads.

DISCLOSURE OF THE INVENTION

The object of the invention is to present a transmission that is an improvement over transmissions known from the prior art, wherein the disadvantages are eliminated or at least attenuated, especially in terms of the precision of positioning. Desirable are a high power density, a high torsional stiffness and generally a high resilience with low wear. It is furthermore the object of the invention to present a manufacturing method for manufacturing such a transmission.

This object is achieved with a transmission according to claim 1 and a method for manufacturing a transmission according to the independent claim. Advantageous developments in embodiments are found in the dependent claims and in this description.

Embodiments of the invention relate in particular to coaxial transmissions. Normally, transmissions according to the invention comprise an interior cam disc with profiling as the drive element and a ring gear having interior toothing, or an exterior drive element with inner profiling and an interior gear wheel, or an interior gear rack that provides the toothing when there is an exterior drive element. The configurations of embodiments relate to linear transmissions for converting rotation into a linear movement. Transmissions according to the invention possess initial stress which can also be termed inner initial stress. Typically, this means that individual components of the transmission strain against each other in an unloaded state. The minimization or elimination of play in the transmission is thereby achieved.

The toothing is typically a circumferential toothing. The teeth or tooth tips of the tooth segments engage in the toothing, wherein the tooth segments are typically mounted so as to be shiftable in a linearly radial manner relative to the tooth holder. "Linearly radial" normally means that a guide in the radial direction exists which only allows the tooth segment to move in the radial direction. Typically, the tooth segment can be shifted linearly in precisely one direction by the guide; this can be achieved if for example the tooth segment has a constant cross-section in the direction of the shift over a specific section, wherein the tooth holder also has an opening for the tooth segment with a constant cross-section. Normally, the tooth segments are mounted in the tooth holder so as to be shiftable in precisely one direction. Furthermore in typical embodiments, the rotational degree of freedom of the tooth segments relative to the tooth holder is blocked about the longitudinal axis of the transmission. This can, for example, be achieved by means of a linear tooth segment guide in the radial direction in the tooth holder. As a result, the tooth segments with the tooth holder rotate about the longitudinal axis of the transmission but, however, not relative to the tooth holder.

In typical embodiments of the transmission according to the invention, at least part of the tooth segments is designed to be rigid. The term "rigid" is typically to be understood in a technical manner, that is, the bending of the tooth segments is so small due to the rigidity of the tooth segment material that it is at least substantially irrelevant to the kinematics of the transmission. Rigid tooth segments comprise in particular tooth segments that are made of a metal alloy, in particular steel or a titanium alloy, a nickel alloy or other alloys. Furthermore, rigid tooth segments can also be provided that are of plastic, especially in the case of transmissions in which at least one of the following parts is also made of plastic: Toothing on a ring gear or a gear wheel, tooth holder and drive element. In typical embodiments of the invention, the tooth holder and tooth segments are made of a metal alloy, or additionally the toothing, or additionally the drive element are made of a metal alloy. The advantage of such transmissions is that they are extremely torsionally rigid and highly resilient. Transmissions made of plastic have the advantage of low weight. The expression "rigid" means in particular flexural rigidity about a transverse axis of the tooth segment. This means in particular that, when the tooth segment is viewed as a bar extending from a tooth foot to a tooth tip, flexural rigidity exists that substantially prevents flexural deformation between the tooth tip and tooth foot. The flexural rigidity yields extremely high resilience and torsional rigidity for the transmission.

In typical embodiments, a foot joint is arranged between the tooth segment and profiling. Advantageous embodiments comprise a pivoting segment that is arranged between the drive element with the profiling, and at least one tooth segment in each case. The pivoting segment can be employed to form the foot joint. The foot joint allows the tooth segment to tilt relative to the profiling, or relative to the pivoting segment. Typically, the tooth segment is loosely connected to the pivoting segment. "Loose connection" in this context preferably means that the tooth segment is only placed on the pivoting segment, and normally placed directly. Preferred pivoting segments comprise a contour that prevents the tooth segment from slipping off the pivoting segment, or prevent the pivoting segment from slipping in at least in one direction. It should be noted that the pivoting segment is thereby held in its position in the peripheral direction relative to the tooth holder by the radially and linearly guided tooth segments. Such a profile can for example be a bead that engages in a recess. This guarantees that the tooth segment does not slide across the pivoting segment. This accordingly causes the pivoting segment to be fixed at the position of the tooth, thereby excluding relative movement in the peripheral direction between the tooth segment and pivoting segment. The contour is preferably disposed to block shifting in a peripheral direction, thus preventing sliding off in a peripheral direction. In other embodiments, however, spherical cap-shaped, ball-shaped or other elevations can be provided that prevent the pivoting segments from slipping relative to the tooth segments.

Typical pivoting segments enable a segmented bearing. In typical embodiments, the pivoting segments, or other bearing segments such as plates, form a segmented bearing. The advantage of the segmented bearing is that it can adapt to the profiling of the drive element, and it also enables a reliable transmission of force in a radial direction. In order to reduce friction from the relative movement between the pivoting segments and drive element, a bearing can be provided such as a friction bearing or roller bearing, wherein in particular, needle roller bearings or ball roller bearings can be used in typical embodiments. The pivoting segments preferably have edges that face each other with elevations and recesses, for example in the shape of a wave or a zigzag shape. This has the advantage that needle rollers which are arranged under the pivoting segments can be reliably held in the space between the pivoting segments and the drive element, even when there is a large distance between the pivoting segments.

The loose connection between the tooth segment and pivoting segment has the advantage of easy assembly. In this case, a "loose connection" means in particular that the tooth segments are not protected from being lifted off of the pivoting segments. In generic transmissions, the tooth segments are generally prevented from lifting off of the pivoting segments in that the tooth tips of the tooth segments are guided by the toothing.

Typical embodiments of the invention comprise a drive element with profiling. The profiling preferably has a non-circular or non-ellipsoid arc shape or curve. The advantage of the non-circular or non-ellipsoid arc shape is that any profiling can be used in order, for example, to establish different transmission ratios. According to this application, eccentrics also include circular or ellipsoid shapes since with eccentrics, only the rotational axis and not the central axis corresponds to the shape of a circle, even though a circular shape still exists. In typical embodiments, the tooth holder or the toothing is designed circular. This offers the advantage of a simple tooth holder and toothing geometry. Typically, force is transmitted to the slow side of the transmission between the toothing and tooth holder. The advantage is that the path for transmitting force is extremely short, thereby yielding extremely high rigidity. Embodiments that satisfy these conditions comprise in a nonexclusive embodiment: Transmission with an interior cam disc as a drive and exterior ring gear with toothing, wherein the tooth holder is arranged between the ring gear and cam disc; exterior profiling on a ring gear for driving the radially moving tooth segments inward toward a toothing that is arranged on a ring gear or a gear rack. In conjunction with the initial stress according to the invention, the embodiments offer the particular advantage that the above-described path of force for transmitting the drive force is extremely short, however, the initial stress is transmitted across a plurality of elements and a large distance since the initial stress extends across at least two tooth spaces. High rigidity for transmitting force is thereby achieved without significant loss due to the initial stress.

Normally in such embodiments, at least two of the tooth segments, or at least two subgroups of tooth segments, engage in the toothing with precisely one toothing flank when the transmission is in an unloaded state. Typically, at least two tooth segments, or at least two subgroups of tooth segments, engage with different toothing flanks in each case. "Different" in this case means, for example, that a first subgroup engages with tooth flanks in a first direction of rotation, and the second subgroup engages with tooth flanks in a second direction of rotation opposite the first direction of rotation. Initial stress thereby accumulates between the two subgroups, or between the two tooth segments.

In embodiments according to the invention, typically only the front tooth flank of a first tooth segment driven into the toothing engages with a respective toothing flank of the toothing, and only the rear tooth flank of a second tooth segment driven into the toothing engages with a respective toothing flank of the toothing. The terms "front" and "rear" are normally to be understood as meaning that these tooth flanks correspond to different directions of load transmission, or different directions in the peripheral direction. "Front" and "rear" therefore refer to a randomly selected peripheral direction. The first tooth segment can also be first subgroup of the tooth segments, and the second tooth segment can also be a second subgroup of tooth segments. Typically, two or more neighboring tooth segments with the same tooth flank alignment engage with the corresponding toothing flanks. When the transmission is in an unloaded state, typically the first tooth segment, or first subgroup of tooth segments, is subject to stress from the second tooth segments, or the second subgroup of tooth segments. Between the first tooth segment and the second tooth segment, there is preferably at least one other tooth segment, and neither of its tooth flanks engage with the toothing flanks. Furthermore, the geometries of the tooth segment, toothing, pivoting segment or ring gear are chosen so that the additional tooth segment typically has play in the radial direction. This reduces friction loss. Normally, this intermediately arranged additional tooth segment is at the maximum radius or distance of the contour of the cam disc. The tip of the tooth tip of the at least one tooth segment between the first tooth segment and second tooth segment typically lies in the corresponding curve at the base of the tooth. "Between" in this case means the shorter peripheral direction between the first and second tooth segment. No tooth flank is engaged even of the tooth segment that lies beyond the minimum contour of the cam disc. These considerations apply to an instant during the rotation of the transmission; at other times, other tooth segments assume the described positions.

Typical embodiments achieve initial stress by oversizing. The oversizing can relate to the drive element, the output element, a pivoting segment, a plurality or all of the tooth segments, or the toothing. A plurality of components can also be oversized in a harmonized manner. In typical embodiments, the tolerance chain or oversizing chain has the desired oversizing.

The toothing and the teeth of the tooth segments typically have curved flanks. Examples of flank curvatures are a cylindrical curvature, or a curvature in the shape of a logarithmic spiral. Reference is made to DE 10 2007 011 175 A1 for one possible embodiment of a curvature in the form of a logarithmic spiral. The advantage of the curved surface is that the engaged flanks lie against surfaces and not only a line or point. Extreme rigidity is thereby achieved when transmitting force between the toothing and tooth segments.

The oversizing is preferably at least 0.0001%, or at least 0.0005%, or at least 0.001% of the diameter, or the inner diameter, of the toothing. The maximum oversizing is typically 0.2%, or a maximum 0.05%, or a maximum 0.01% of the diameter of the toothing, or the inner diameter of the toothing. Given the high rigidity of the transmission resulting from the design, and possibly also from the lack of resilient or elastic elements, a slight amount of oversizing is sufficient to achieve initial stress of, for example, at least 10%, at least 20%, at least 50% or a maximum of 100% of the nominal torque of the transmission. Typical embodiments are free of spring elements, or free of elastic elements. Typically, "free of spring elements" or "free of elastic elements" relates to the transmission or the components along the path of force transmitted by the transmission, i.e., from the toothing via the tooth segments, the tooth holder, to an output or to a thrust bearing. This yields the advantage of high rigidity. The particular advantage of embodiments according to the invention is that initial stress can be achieved with extremely slight oversizes without necessitating spring elements or the like. High rigidity, freedom from play and low wear is thereby achieved. In typical embodiments, the initial stress is a maximum of 50%, or a minimum of 50%, of the nominal load of the transmission. The expression "nominal load" typically means the torque continuously transmissible by the transmission, or the continuously transmissible drive torque of a linear transmission. Additional typical embodiments have an initial stress that corresponds to at least 80%, or at least 100% of the nominal load of the transmission. Freedom from play is thereby achieved over the entire load range of the transmission.

In typical methods and embodiments for manufacturing a transmission, an oversize is provided as a function of the rigidity and a desired initial stress. A special feature of typical embodiments is that all the elements of the transmission are designed rigid to promote the drive or transmission of force; these rigidly designed components, including the tooth segments, yield a hyperstatic, prestressed system. This contrasts with the existing teaching regarding transmissions which avoids multiple static redundancies in conjunction with initial stress to avoid constrained states.

The combination of segmented bearing and a curved tooth flank contour, for example in the form of a logarithmic spiral, has proven to be useful in transmitting particularly high torque in a prestressed transmission. In embodiments, pivoting segments or foot joints of the tooth segments are typically mobile relative to each other in a peripheral direction. This enables unforced guidance of the tooth segments and pivoting segments. Excessive constraining forces in conjunction with initial stress can thereby be avoided.

The advantages of the invention are extremely high rigidity in combination with the ability to design the transmission free of play. The initial stress is unproblematic for the transmission since the tooth segments never lie against the toothing of the ring gear, gear wheel or a gear rack with both flanks. In contrast to other prior art transmissions, constrained states are thereby effectively avoided. Embodiments of transmissions according to the invention are particularly advantageous that possess an exterior cam disc or an interior cam disc as a drive which, in particular, is designed hollow. Constraining parameters can be compensated by designing the cam disc as a hollow shaft to reduce constraining force. In contrast, the transmission of force by the toothing is extremely short and rigid across the tooth segment to the tooth holder which yields high transmission rigidity. Additional advantages can be achieved by choosing initial stress that is exceeded by moderate or large external loads. Consequently when an external load is greater than the initial stress, only flanks of tooth segments facing the same direction lie on the toothing, and this reduces wear under high loads and simultaneously eliminates torsional play under low loads. Another advantage of the invention is that the initial stress can be adjusted to any application by means of predetermined operating points in order to enhance energy efficiency and cost-effectiveness.

BRIEF DESCRIPTION OF THE DRAWINGS

The invention will be further explained below with reference to the accompanying drawings; the figures depict the following.

DESCRIPTION OF EXEMPLARY EMBODIMENTS

In the following, typical embodiments of the invention will be described with reference to the figures. The invention is not restricted to the exemplary embodiments; rather, the scope of the invention is established by the claims. In the description of the embodiment, the same reference numbers will be used for the same or similar parts in certain circumstances in different figures and for different embodiments to make the description more understandable. This does not mean however that the corresponding parts of the invention are restricted to the versions depicted in the embodiments.

Figure 1:
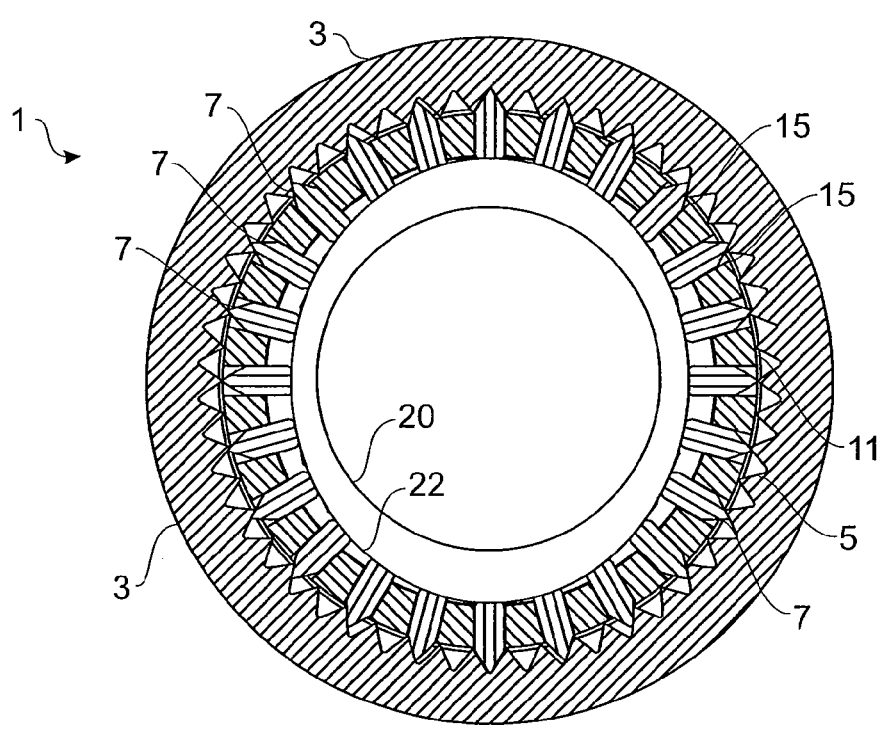
FIG. 1 Schematically portrays a sectional view of a first embodiment of the invention.

FIG. 1 schematically portrays a side view of an exemplary embodiment. FIG. 1 shows a section of a transmission 1 having a ring gear 3 with internal, peripheral toothing 5. Tooth segments 7 engage in the toothing 5. For the sake of clarity, not every tooth segment 7 in FIG. 1 is provided with the reference number 7. The tooth segments 7 are mounted in a tooth holder 11 in a radially shiftable matter. In this case, the tooth holder 11 has radially aligned, channel-like round or slotted openings 15 to ensure the radial guidance of the tooth segments 7 in the tooth holder 11. Due to the radial guidance in the openings 15, the tooth segments 7 can only move in a radial direction; in particular, rotation about a longitudinal axis of the transmission 7 is impossible.

The tooth segments 7 are driven by a drive element 20 that is designed as a hollow cam disc. The drive element 20 has profiling 22 to drive the tooth segments 7 in a radial direction. The profiling 22 has a contour with two elevations over the perimeter such that opposing tooth segments 7 extend furthest into the tooth gaps of the toothing 5.

The tooth segments 7 are designed to be clamped between the drive element 20 and the toothing 5 of the ring gear 3 under the effect of guidance by the tooth holder 11. This occurs because the tooth segments 7 are oversized by 0.01% of the diameter of the toothing 5. The tooth segments 7 are hence designed long enough to be accommodated in the transmission 1 under initial stress. This generates inner initial stress in the transmission 1.

The tooth segments in the transmission portrayed in FIG. 1 are arranged with a plain bearing on the profiling of the drive element. Such a loose placement of the tooth segments on the profiling of the drive element is enough due to the radial, linear guidance of the tooth segments in the tooth holder and the guidance of the tooth segments on the flanks of the toothing. In general, a bearing of this type that permits the feet of the tooth segments to move in a peripheral direction without the tooth segments being fixed is described as a loose bearing in this application. The feet of the tooth segments are hence only forcefully guided in a radial direction. It is typical of the loose bearing that the tooth segments can lift off of the profiling of the drive element if they have not been pressed against the profiling of drive element by the toothing. This loose bearing enables a particularly simple design and simultaneously allows unnecessary initial stress to be avoided in the region of the drive element profiling since the feet of the tooth segments are not forcibly guided in the peripheral direction.

The tooth segments in the exemplary embodiment in FIG. 1 have been installed oversized. It is also possible, however, to install the toothing, or the drive element, or other components of the transmission oversized to achieve the inner initial stress. The inner initial stress describes initial stress that exists when the transmission is in a resting state, i.e., without an external drive or external load acting on the transmission.

In the exemplary embodiment in FIG. 1, the drive element is arranged inside, and the toothing is arranged outside. With such a configuration, the output is tapped at the ring gear with the toothing, or at the tooth holder, wherein the other element is fixed in each case. In other embodiments, the drive element is arranged outside, i.e., outside the tooth holder, and the toothing is arranged inside. It is also possible to tap the output from the inner toothing or from the tooth holder. The tooth holder with its openings can also be termed a tooth cage in which tooth segments are shiftably accommodated and guided in a radially linear manner.

Figure 2:
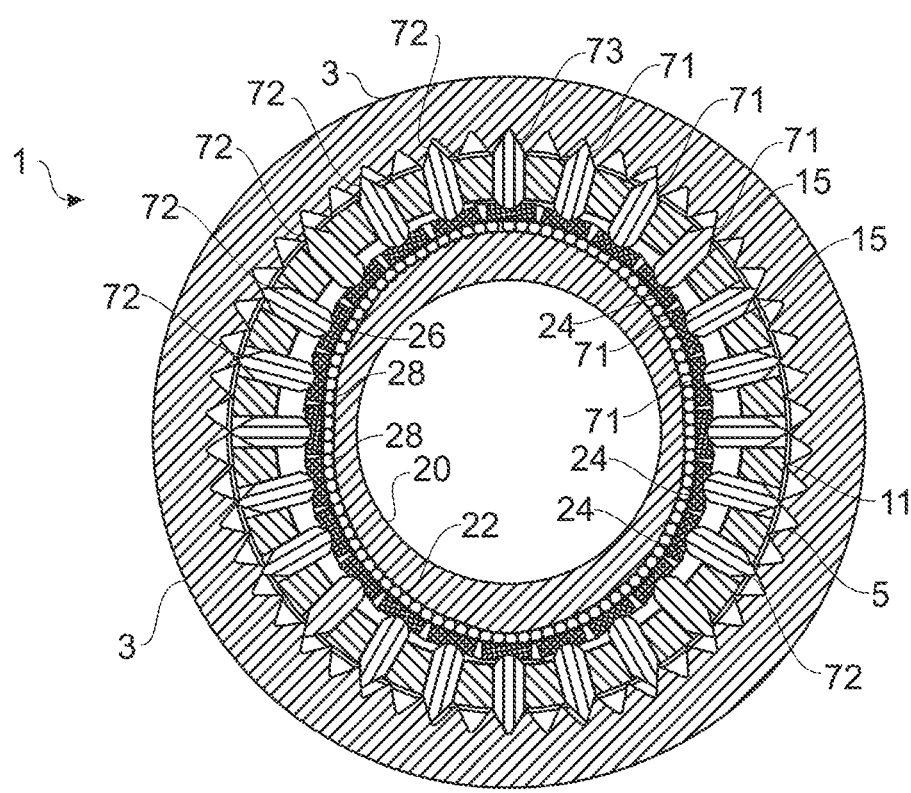
FIG. 2 A sectional view of another embodiment.

FIG. 2 shows a section of another embodiment of a transmission 1 according to the invention in the form of a coaxial transmission. In the embodiment in FIG. 2, tooth segments 71-73 are borne with a segmented bearing. Not all of the teeth, as well as several parts, of the transmission 1 are provided with reference numbers in FIG. 2 for the sake of greater clarity. The segmented bearing comprises pivoting segments 24 which each have a recess in which a bead 26 of the tooth segment 71-73 engages. A pivoting segment 24 is provided for each of the tooth segments 71-73. A tooth segment 71-73 preferably comprises at least two teeth which are arranged axially next to each other to increase stability. The beads 26 each form foot joints for the tooth segments 71-73 so that the tooth segments 71-73 can tilt relative to the pivoting segments 24 to ensure unforced guidance. The pivoting segments 24 can shift relative to each other in a peripheral direction, thus allowing the distances between the pivoting segments 24 to change. In this manner, the degree of freedom in the peripheral direction of the pivoting segments 24 is also unrestricted. This enables substantially unforced guidance and substantially unforced radial driving of the pivoting segments 24 by means of the profiling 22 of the drive element 20. Needle rollers 28 are provided to minimize frictional resistance between the profiling 22 and the pivoting segments 24. In other embodiments, balls or other roller bearings are provided to bear the pivoting segments.

In a peripheral direction, the pivoting segments 24 typically have an edge with shapes such as a wavy or zigzag edge so that the needle rollers 28 can be held in the bearing gap even when there is a significant distance between the pivoting segments 24.

The toothing 5 has toothing flanks that possess the shape of a logarithmic spiral. This preferably means that at least part of the toothing flanks have the shape of a logarithmic spiral. Likewise, the flanks of tooth segments 71-73 typically have a corresponding shape, i.e., that of a logarithmic spiral. This also allows the surfaces of the toothing 5 and the tooth segments 71-73 to contact when they engage. The tooth segments 71-73 in FIG. 2 can be divided into groups. A first group of first tooth segments 71 always engages with the toothing 5 by means of tooth flanks that lie in a clockwise direction. The second group of second tooth segment 72 always engages with the toothing 5 by means of opposing flanks. In the middle between these two groups of tooth segments 71, 72 is a middle tooth segment 73 that is at the maximum deformation of the profiling 22. Neither of the flanks of this tooth segment 73 engages with the toothing 5, only its tip engages. The tip of tooth segment 73 contacts the corresponding tooth base of the corresponding tooth gap of the toothing 5. Since the initial stress has accumulated between the first group of first tooth segments 71 and the second group of second tooth segments 72, whereas force is transmitted across a short path between the ring gear 3 across the tooth segments 71, 72 to the tooth holder 11, high rigidity is achieved for the transmission of torque, but the rigidity for the initial stress is comparatively low. The tooth segments 71, 72, 73 are rigid and made of steel like the other components of the transmission 1 shown in FIG. 2. Different types of steel or different metal alloys such as titanium or nickel alloys can also be used; in addition, plastic transmissions are typical embodiments.

Figure 3:
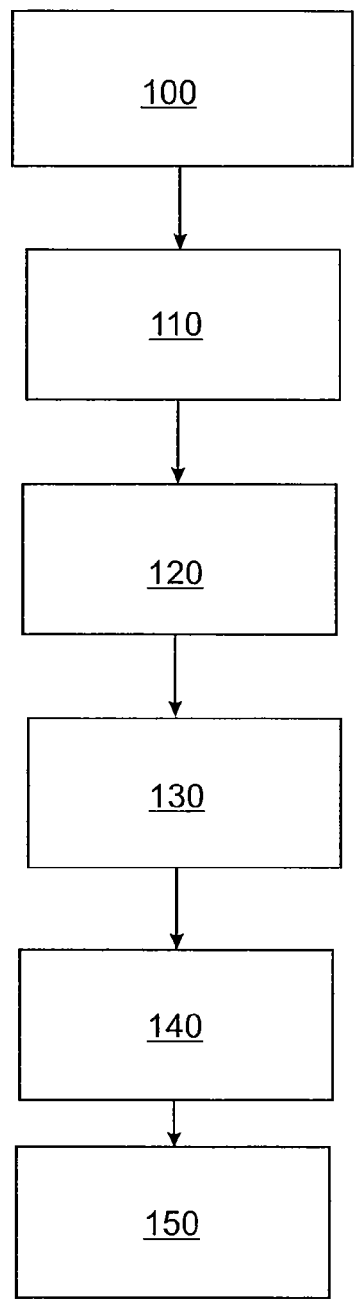
FIG. 3 A schematic flowchart of an embodiment of a method.

FIG. 3 shows a typical method of the invention. In this method, first the rigidity of a transmission is determined in a step 100, for example corresponding to the embodiments in FIG. 1 or 2, or another transmission in one of the above-described typical embodiments according to the invention. Such a transmission can be constructed free of initial stress, and the rigidity can be determined on a test bench. Another way to determine rigidity is by a calculation, for example using finite elements. In a following step 110, a desired initial stress is chosen for the transmission. The desired initial stress can be determined by analyzing the application and the rigidity behavior that it requires. Another possibility are requirements that are specified by a transmission user or customer. The expression "initial stress" is to be generally understood as both a force and torque. For example, in step 110, you can specify the initial stress to be 20% of the nominal load of the transmission; other examples are 50% or 70%. Other initial stresses can also be selected. The relative kinematics of the transmission is determined in step 120. In this case, the relationship between a radial movement of a tooth segment, or an extension of a tooth segment, and a resulting rotation of the transmission is of interest. This relationship is determined in particular by the pressure angle of the toothing. In typical embodiments, the pressure angle remains at least substantially constant between the tooth segments and toothing, wherein usual values are between 20° and 50° and typically between 25° and 40°. The constant pressure angle makes it easier to determine the oversizing for a desired initial stress. The kinematics are typically determined in an analytical geometric model, but a solid body simulation is also possible. The relative kinematics between a tooth segment and the toothing is typically of particular interest since a relationship is thereby determined between a radial shift of the tooth in the tooth holder and a rotation of the output side of the transmission by a specific angular amount. In a linear transmission, a relationship is correspondingly determined between a linear shift of a tooth segment relative to a linear shift of a gear rack or the like. An oversizing of the tooth segments is determined in a step 130 from the values calculated in this matter and the desired initial stress. In general, it is sufficient to determine the oversizing of one of the components, or a group of components, of the transmission such as, for example, the drive element, the pivoting segments, the needle rollers (if available), the tooth segments or the toothing or ring gear. Furthermore in other transmission designs, other components can be oversized to build up inner initial stress. With reference to the example of tooth segments or the example of pivoting segments, a corresponding extension or corresponding oversizing of the tooth segments is provided using the values calculated above in steps 100 to 120, and this corresponds to a specific rotational angle with reference to the kinematics, wherein this rotational angle from the rigidity diagram should in turn correspond to the preselected initial stress. Oversizing is determined in step 130 in this manner. Finally, in step 140, a corresponding dimension for the tooth segments is selected, and corresponding tooth segments for the assembly of the transmission are selected. Another typical option is to grind the profiling of the cam disc to correspond to the specified oversizing. Adaptation is easy in this manner. In manufacturing embodiments, typically the tolerances of the individual components need to be considered. They can be selected by forming classes of tooth segments that are well harmonized with each other. When grinding the cam disc, normally the measured component sizes are taken into consideration to obtain a precise geometry. The transmission is then assembled in step 150. The example was described with reference to the tooth segments as an oversized component; the same is also possible for other components, especially for the above-described exemplary components.

Figure 4:
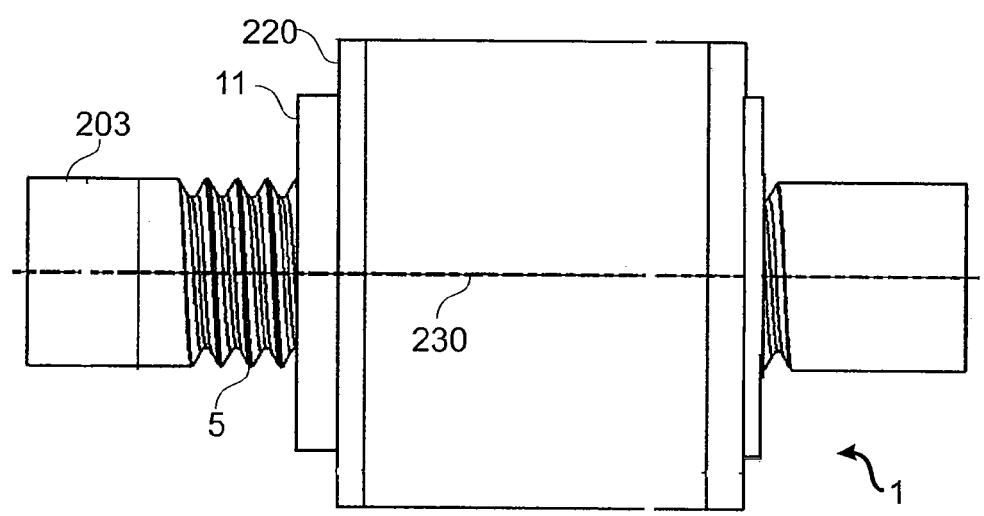
FIG. 4 Portrays a schematic side view of an embodiment.

FIG. 4 shows a schematic side view of a transmission 1 as an exemplary embodiment of converting a rotational movement into a linear movement or vice versa. The transmission 1 comprises an interior rod 203 having toothing 5 in a middle region. The toothing 5 of the rod 203 in FIG. 4 is similar to the toothing of a threaded rod, however the toothing 5 of the rod 203 is not used as a thread. The rotational degree of freedom of the rod 203 is blocked, i.e., it is mounted so as to be non-rotatable.

The exemplary embodiment in FIG. 4 furthermore comprises a tooth holder 11 that is arranged concentric to the rod 203. The tooth holder 11 is in turn encased by a drive boot 220 that is also arranged concentric to the rod 203. The drive boot 220 is rotatably mounted; in contrast, the rotational degree of freedom of the tooth holder 11 is blocked and fixed axially, that is, it does not rotate relative to the rod 203. The drive boot 220 surrounds an interior cam disc with profiling for driving the teeth accommodated in the tooth holder 11 (not shown in FIG. 4). The teeth are mounted in the tooth holder to be shiftable in a linearly radial manner so that they are aligned for engaging with the rod 203. When the drive boot 220 is rotated, the rod 203 shifts linearly relative to the tooth holder 11 in the direction of the longitudinal axis 230 of the transmission 1. It is possible to fixedly mount the tooth holder 11, rotate the drive boot 220, and tap a linear movement or a thrust from the rod 203. The particular advantage over other comparable transmissions for a linear thrust is that the tooth holder 11 and the rod 203 do not have to be mounted so as to rotate; hence the transmission can have a strong thrust and high rigidity while the dimensions of the transmission 1 are compact. The teeth of the transmission 1 in FIGS. 4 and 5 are manufactured oversized so that the transmission 1 has inner initial stress.

Figure 5:
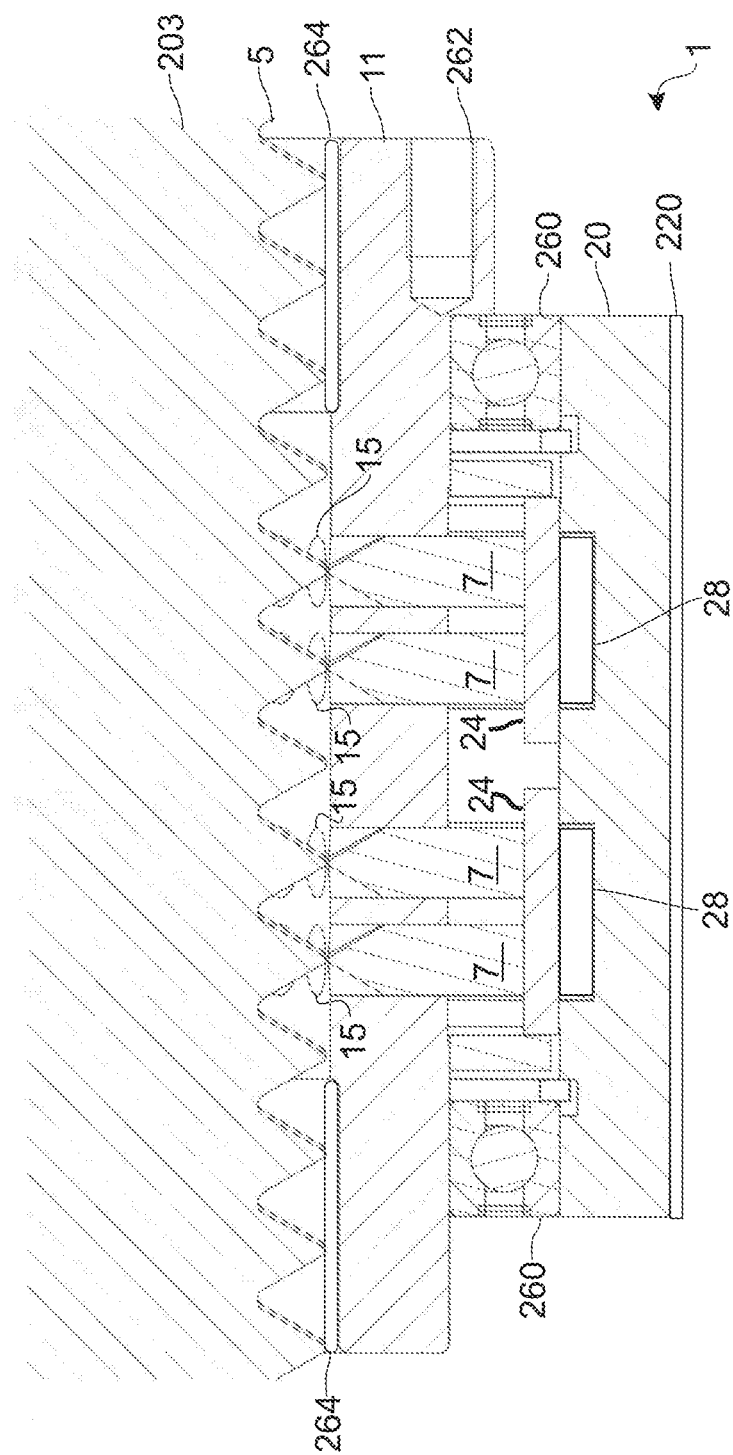
FIG. 5 Portrays a section of the embodiment from FIG. 4.

FIG. 5 shows a partial sectional view along the longitudinal axis of the transmission from FIG. 4. Again, the same reference numbers are used for equivalent or similar parts, and not all of these parts are described again in detail.

Arranged in the tooth holder 11 are four circular peripheral rows of openings 15 in which teeth 7 are accommodated in four toothed discs. The teeth engage in the toothing 5 of the rod 203. The toothing 5 of the rod 203 and teeth 7 are arranged as at a slight angle relative to the sectional plane so that parts of the flanks of the teeth 7 and toothing 5 can also be identified. In the section portrayed in FIG. 3, the displayed teeth 7 are completely withdrawn in the displayed position of the transmission 1 so that the tooth tip 7 are arranged on the heads of the toothing 5. The displayed teeth 7 are at a dead center. Other teeth that are disposed at other locations on the perimeter of the tooth holder 11 are not completely withdrawn but are instead in different positions, such as inserted completely to the tooth base of the toothing 5 (bottom dead center), or engaged with a flank.

The radial movement of the teeth 7 is generated by the drive with a drive element 20 in the form of a cam disc. The drive element 20 of the cam disc, as previously explained, has profiling that changes over the perimeter. The teeth 7 are combined into sets of two, wherein two teeth 7 which neighbor each other in a longitudinal direction 230 are accommodated in one pivoting segment 24. The pivoting segments 24 are borne by needle rollers 28 in the drive element 20. The drive element 20 drives a peripheral series of pivoting segments to 24 in which two rows of teeth are arranged. The advantage of two teeth 40 being borne in one pivoting segment 24 is that the pivoting segments 24 are secured against twisting and are hence fixed in a defined position with respect to rotating in the radial direction of the transmission 1. The pivoting segments 24 typically have recesses in which the correspondingly shaped feet engage with beads of the teeth 7.

The cam disc is mounted together with the drive boot 20 by means of ball bearings 260 on the tooth holder 11. The tooth holder 11 is provided with a blind hole 262 for stationery fixation by means of screws. The tooth holder 11 is stationarily fixed, whereas the rod 203 is only blocked against rotation and is mounted with two bearing sleeves 264 to be shiftable in an axial direction. However, the rod 203 is already borne by the plurality of toothed discs of teeth 7 sequentially in an axial direction. When the transmission 1 is driven at the drive boot 20 and the cam disc as a drive element with profiling is correspondingly rotated, the teeth 7 are driven radially inward by the drive element 20 or radially outward by the toothing 4 depending on the position of the cam disc 50 and the position of the respective tooth 7, and this consequently generates a linear movement of the rod 203 relative to the tooth holder 11.

In typical embodiments, the rod is borne to be shiftable in an axial direction by means of a plane bearing bush, also termed a bearing sleeve. The bearing sleeve preferably glides exclusively on the tooth tips or tooth tips of the toothing of the rod. This makes assembly easy. In other exemplary embodiments, the rod is borne at least at one end. This means that the rod has to be longer to create enough area for the bearing, but it can increase stability.

The invention is not restricted to the above-described embodiment; rather, the scope of the invention is established by the accompanying claims.

The invention claimed is:

1. A transmission, in particular, a coaxial transmission or a linear transmission, comprising:
   a toothing;
   a tooth holder in which a plurality of tooth segments are accommodated to engage with the toothing, wherein the tooth segments are borne to be radially shiftable relative to the tooth holder; and a drive element having a profiling for radially driving the tooth segments borne in a radially shiftable manner, wherein the transmission has inner initial stress, wherein the tooth segments have an oversized length that is sufficient to cause the transmission to exist under the inner initial stress, when the tooth segments are accommodated in the transmission, wherein the tooth segments are oversized by at least 0.001% of the diameter of the toothing.

2. A transmission comprising:

a toothing;

a tooth holder;

a plurality of tooth segments accommodated shiftably in the tooth holder to engage with the toothing; and a drive element for driving the plurality of tooth segments into the toothing in a radial direction with respect to a rotational axis of the drive element, wherein the plurality of tooth segments are dimensioned to cause clamping of at least one tooth segment between the drive element and the toothing, to achieve an inner initial stress, wherein each tooth segment in the plurality of tooth segments has a front tooth flank, a rear tooth flank, and a tip separating the front and the rear flanks, and a first tooth segment and a second tooth segment of the plurality of tooth segments have a diameter that is greater than the diameter of the toothing to generate an inner initial stress within the transmission, and wherein the first tooth segment driven into the toothing engages with a respective toothing flank of the toothing exclusively with its front tooth flank, the second tooth segment driven into the toothing engages with a respective toothing flank of the toothing exclusively with its rear tooth flank, and between the first tooth segment and the second tooth segment, there is one other tooth segment at a maximum radius of a contour of the drive element, wherein neither of the tooth flanks of the other tooth segment engage with the toothing, and only the tip of the one other tooth segment impacts the toothing to create an inner initial stress within the transmission.

* * * * *